United States Patent [19]

Tomoi et al.

[11] Patent Number: 5,350,523
[45] Date of Patent: Sep. 27, 1994

[54] ANION EXCHANGE METHOD

[75] Inventors: Masao Tomoi; Atsuo Kiyokawa, both of Yokohama; Hiromasa Ogawa; Teruo Onozuka, both of Sendai; Tsuyoshi Ito, Machida, all of Japan

[73] Assignees: Mitsubishi Kasei Corporation, Tokyo; Tohoku Electric Power Co., Inc., Sendai, both of Japan

[21] Appl. No.: 936,337

[22] Filed: Aug. 28, 1992

Related U.S. Application Data

[63] Continuation-in-part of Ser. No. 662,640, Feb. 28, 1991, abandoned.

[30] Foreign Application Priority Data

Feb. 28, 1990 [JP] Japan ................... 2-048021
Feb. 21, 1991 [JP] Japan ................... 3-027472
Aug. 29, 1991 [JP] Japan ................... 3-244731

[51] Int. Cl.$^5$ .................... C02F 1/42; B01J 41/04; B01J 41/12
[52] U.S. Cl. .................... 210/683; 521/25; 521/32; 521/30; 521/38; 525/379; 210/681; 210/686; 376/310; 376/313
[58] Field of Search .................... 521/32, 25; 525/379; 210/683, 686

[56] References Cited

U.S. PATENT DOCUMENTS

| | | | |
|---|---|---|---|
| 2,591,573 | 7/1947 | McBurney | 521/32 |
| 2,591,574 | 7/1947 | McBurney | 521/32 |
| 2,860,097 | 11/1958 | Juda et al. | 204/182.4 |
| 3,843,566 | 10/1974 | Barrett | 521/32 |
| 4,448,899 | 5/1984 | Hass | 521/32 |
| 4,880,595 | 11/1989 | Matsuda | 376/313 |

FOREIGN PATENT DOCUMENTS 0400848 12/1990 European Pat. Off. .
2053242 2/1981 United Kingdom .

OTHER PUBLICATIONS

European Search Report.

Primary Examiner—Fred Zitomer
Attorney, Agent, or Firm—Oblon, Spivak, McClelland, Maier & Neustadt

[57] ABSTRACT

An anion exchange method conducted at a high temperature, which comprises using a crosslinked anion exchanger which comprises structural units having a quaternary ammonium group of the following formula (a) and structural units derived from an unsaturated hydrocarbon group-containing crosslinkable monomer, and of which at least 90% of anion exchange groups are present in the form of a group represented by

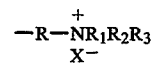

as defined in the following formula (a):

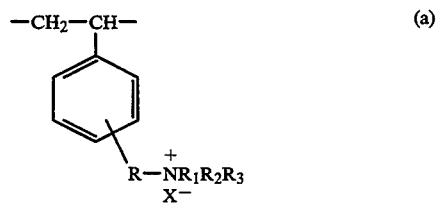

wherein R is a —(CH$_2$)$_n$—group (n=an integer of from 3 to 18) which may include a cyclic hydrocarbon, each of R$_1$, R$_2$ and R$_3$ which are independent from one another, is a C$_1$–C$_8$ hydrocarbon group or a C$_1$–C$_8$ alkanol group, the benzene ring of the formula (a) may be substituted by an alkyl group or a halogen atom, or may be condensed with other aromatic ring, and X is an anion.

31 Claims, 1 Drawing Sheet

ANION EXCHANGE METHOD

This application is a continuation in part of U.S. patent application Ser. No. 07/662,640 filed Feb. 28, 1991 now abandoned and incorporated entirely herein by reference.

FIELD OF THE INVENTION

The present invention relates to an anion exchange method at a high temperature, particularly an ion exchange method using a crosslinked anion exchanger excellent in heat durability at a high temperature of at least 60° C. More particularly, the present invention relates to a method for treating hot water in a power plant by using a crosslinked anion exchanger excellent in heat resistance, which largely reduces heat loss in the treating system and which remarkably prevents the degradation of performance caused by thermal shock of the resin itself, as compared with the cases of using conventional anion exchange resins.

BACKGROUND OF THE INVENTION

Heretofore, generally, an anion exchange resin is preferably used for removing anions, and as anion exchange resins, various resins are known which have, as functional groups, various anion exchange moieties, for example, amine-type substituent such as primary, secondary and tertiary amino groups and quaternary ammonium. Among them, anion exchange resins of trialkylbenzyl ammonium salt type (e.g. trimethylbenzyl ammonium salt) wherein trialkyl amine is bonded by a covalent bond to the benzyl group of a unit derived from monovinyl aromatic compound, are particularly excellent in the ion exchange capacity and are widely used.

As well known, various hot water and normal temperature water in a power plant are required to be demineralized and purified. Examples of a nuclear reactor used in an atomic power plant include a boiling water reactor (BWR) and a pressurized water reactor (PWR). The former is a reactor where a cooling water is heated and converted into vapor which is then directly supplied to a turbine, and the latter is a reactor where a primary cooling water is heated and supplied to a vapor-generator where a secondary cooling water is heated and converted into vapor which is then supplied to a turbine.

In any type of the above mentioned nuclear reactors, a condensate demineralizer of a reactor water charged with an ion exchange resin is provided in the circulation system of the cooling water to remove radioactive material from the reactor water and to purify the reactor water.

In addition to the above device, the reactor water of hot water or water of a rising temperature is treated with ion exchange resin also in a demineralizing tower for removing boric acid, a boric acid-recovering device, a used fuel pool water-purifying device and/or a condensate demineralizer. The condensate demineralizer is used also in a large once-through boiler in a thermal electric power plant.

Examples of the demineralizer include a device using a mixed bed comprising an anion exchange resin and a cation exchange resin, a device prepared by connecting a single bed of an anion exchange resin with a single bed of a cation exchange resin, and a device prepared by precoating a powdery or fiber-like resin on a nylon or stainless made element.

Among the conventional ion exchange resins, generally, an H type cation exchanger has a satisfactory heat resistance at 120° C., but an OH type anion exchange resin has a heat resistance at 40°–60° C. and a Cl type anion exchange resin has a heat resistance at about 60° C. Thus, in a demineralizer using these conventional anion exchange resins, the performances of the anion exchange resins are degraded and their demineralizing performances are lowered when hot water of 60° C. or higher is passed for a short or long period of time. Therefore, in the treatment of various hot waters in a power plant, a hot water having a temperature of at least 60° C. must be cooled to a water having a temperature of less than 60° C. (generally 50° C. or lower).

Under such a high temperature condition of above 60° C., the anion exchange resins of trimethylbenzyl ammonium salt type undergo detachment of the quaternary ammonium ion exchange groups or the quaternary ammonium group is converted to a tertiary amine group, and they are not suitable for use under a high temperature condition for a long period of time. U.S. Pat. No. 4,025,467 discloses that a strong basic anion exchanger can be obtained by reacting a quaternary amine to a crosslinked copolymer of an aromatic monovinyl hydrocarbon with an aromatic divinyl hydrocarbon having haloalkyl groups of the formula —$C_nH_{2n}$—X wherein —X is chlorine or bromine, and —$C_nH_{2n}$ is an alkylene group with n being from 1 to 4. However, specifically disclosed is only the strong basic anion exchanger wherein n is 1, and there is no description to distinguish between the linear case and the branched case among —$C_nH_{2n}$ groups. If the one wherein n is 3 or 4 were produced in accordance with the method concretely disclosed in this publication, the resulting —$(CH_2)_3$— or —$(CH_2)_4$— would be present only at a part of anion exchange groups of the entire resin, whereby the heat durability would not be improved. However, this publication describes nothing about the heat durability of the resin.

EP-A-400,848 discloses an anion exchanger having

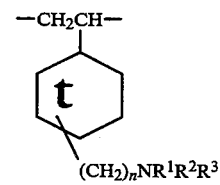

unit which is structurally similar to the anion exchange resin used in the present invention, but it is used as an anti-high cholesterol agent, thus its use being essentially different from that of the present invention.

Accordingly, an anion exchanger having higher heat durability has been desired.

SUMMARY OF THE INVENTION

The present invention relates to a method for removing anions in a solution of a high temperature by having the anions adsorbed on an anion exchange resin.

In the treatment of a condensate (recycled water) in a power plant in accordance with the conventional technique, hot water of a high temperature is cooled to 50° C., and is then heated to vaporize. On the other hand, according to the present invention, since hot water has only to be cooled to about 100° C., heat loss in the treating system can be largely reduced and the degradation of performance caused by thermal shock of the resin itself can be remarkably prevented, thus an efficient method for treating hot water in a power plant by using an anion exchanger excellent in treating performances being provided.

The anion exchanger used in the present invention is a crosslinked anion exchanger which comprises structural units having a quaternary ammonium group of the following formula (a) and structural units derived from an unsaturated hydrocarbon group-containing crosslinkable monomer, and of which at least 90% of anion exchange groups are present in the form of a group represented by

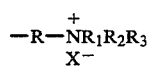

as defined in the following formula (a):

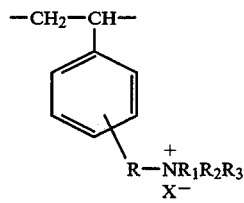

wherein R is a —$(CH_2)_n$—group (n=an integer of from 3 to 18) which may include a cyclic hydrocarbon, each of $R_1$, $R_2$ and $R_3$ which are independent from one another, is a $C_1$-$C_8$ hydrocarbon group or a $C_1$-$C_8$ alkanol group, the benzene ring of the formula (a) may be substituted by an alkyl group or a halogen atom, or may be condensed with other aromatic ring, and X is an anion.

This anion exchanger of the present invention is excellent in the heat durability and can be used in various fields where a heat durable anion exchanger is required. The ion exchange method "at a high temperature" used herein means an ion exchange method at a temperature of above 60° C. which could not be conducted by the conventional anion exchangers. The ion exchange method at such a high temperature is satisfactorily applicable for removing anion impurities in condensates (recycled waters) from atomic power plants and thermal electric power plants.

FIG. 1 illustrates the outline of a conventional boiling water reactor (BWR), and FIG. 2 is the longitudinal section of the demineralizer of the present invention.

DETAILED DESCRIPTION OF THE INVENTION AND PREFERRED EMBODIMENTS

Figure 1:
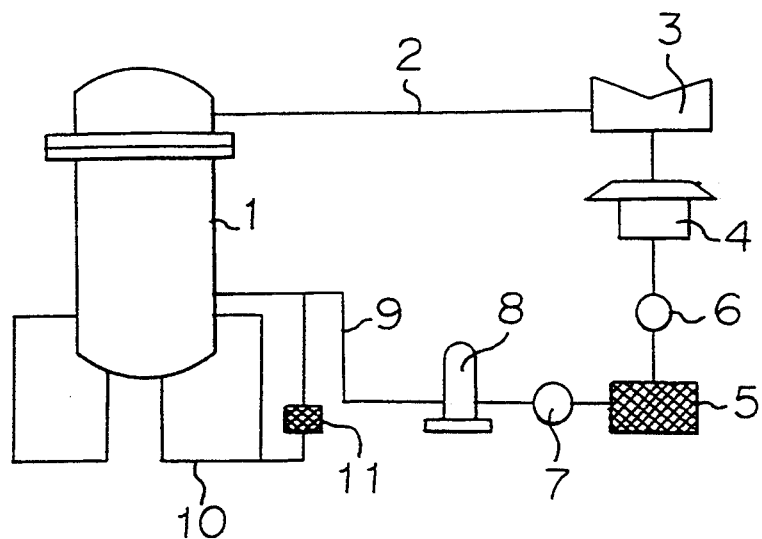

Now, the present invention will be described in detail with reference to the preferred embodiments.

The anion exchanger used in the present invention has quaternary substituted ammonium groups and is capable of adsorbing anions by ionic interaction.

In the above formula (a), R is a —$(CH_2)_n$—group wherein n is an integer of from 3 to 18. This polymethylene group includes a case of a cyclic hydrocarbon such as a cyclohexyl group, for example

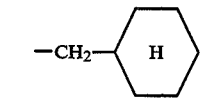

Hereinafter, a —$(CH_2)_n$—group may include a cyclic hydrocarbon in the chain unless otherwise specified. R is preferably a —$(CH_2)_n$—group wherein n is an integer of from 3 to 10, more preferably from 4 to 8.

Each of $R_1$, $R_2$ and $R_3$ may be a $C_1$-$C_8$ straight chain or branched alkyl or alkenyl group, or such a group having a cyclohydrocarbon group such as a cyclohexyl group. Otherwise, an alkanol group having a hydroxyl group bonded to such a group, may be mentioned.

As an example of the group having a cyclic group, a group of the formula

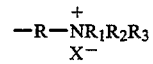

may be mentioned. Each of $R_1$, $R_2$ and $R_3$ is preferably a methyl group.

As the substituent for the benzene ring in the formula (a), an alkyl group such as an ethyl group, or a halogen atom such as chlorine, bromine or iodine, may be mentioned. As an example of the case where the benzene ring is condensed with other aromatic ring, a naphthalene ring may be mentioned.

As such a benzene ring, a benzene ring having no substituent other than

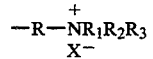

as an anion exchange group is preferred. Also preferred is the one having a methyl group or an ethyl group as the substituent.

$X^-$ in the formula (a) is not particularly limited so long as it is an anion. For example, a halogen ion such as $Cl^-$, $Br^-$ or $I^-$, or other anions such as sulfate anion, $NO_3^-$, $OH^-$ and

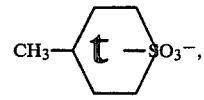

may be mentioned. In the case of a bivalent anion such as a sulfate anion, one molecule of such an anion is adsorbed to two structural unit molecules of the formula (a).

The anion exchanger used in the present invention is characterized in that a group represented by

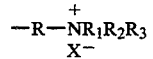

as defined in the above formula (a) constitutes at least 90% of all anion exchange groups of the crosslinked anion exchanger. Namely, in the present invention, the group represented by

is bonded to the terminal of the straight chain of —$(CH_2)_n$—. In other words, even if the carbon number for R is 3 to 18, the group wherein R is a branched chain or the quaternary ammonium group is attached at an intermediate position rather than at the terminal of R, is less than 10% of the total anion exchange groups of the exchanger. In this respect, the anion exchanger used in the present invention is different from conventional anion exchange resins, and for this reason, the heat durability is improved.

The anion exchanger used in the present invention must have the anion exchange groups represented by

in the above mentioned range. It is particularly preferred that substantially all such anion exchange groups are present in the form of the structural units of the formula (a).

The anion exchanger of the present invention can be prepared, for example, by the following method.

The structural units of the formula (a) are usually provided by a precursor monomer of the following formula (b):

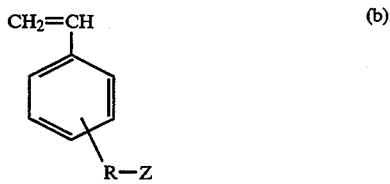

wherein R is as defined above with respect to the formula (a), and Z is a group active for substitution such as bromine, chlorine, iodine or a tosyl group. The benzene ring in the formula (b) may be substituted by an alkyl group or a halogen atom, or may be condensed with other aromatic ring to form e.g. a naphthalene ring.

As the base monomer for the precursor monomer of the formula (b), styrene is preferred. However, as other base monomers, ethylvinyl benzene, vinyl toluene and vinyl naphthalene may be mentioned.

The precursor monomer can be produced usually by a known method as disclosed in, for example, "Journal of Polymer Science, Polymer Chemistry Edition, volume 20, (1982) P. 3015".

Namely, it can be obtained by reacting a polyalkylene dihalide to a chloromethylated base monomer such as chloromethyl styrene by a Grignard method. Here, the polyalkylene dihalide may be the one having a —$(CH_2)_n$—(n =3-18) group, preferably the one having a —$(CH_2)_n$—(n=3-10, preferably 4-8) group. If the carbon number is small, the effect for the heat durability according to the present invention tends to be hardly expected. On the other hand, if the carbon number is too large, the ion exchange capacity per unit weight decreases, which is practically undesirable from the industrial view point.

Further, the precursor monomer of the formula (b) can be prepared also by a method wherein a polyalkylene dihalide is reacted to a chlorinated base monomer such as chlorostyrene by a Grignard method.

The unsaturated hydrocarbon group-containing crosslinkable monomer required to form the anion exchanger of the present invention may, for example, be divinyl benzene, trivinyl benzene, divinyl toluene, divinyl naphthalene, divinyl xylene, ethylene glycol dimethacrylate, diethylene glycol dimethacrylate or trimethylolpropane trimethacrylate. Among them, divinyl benzene is preferred. To the anion exchanger of the present invention, a further copolymer component may be introduced, as the case requires, by using an addition polymerizable monomer other than the precursor monomer and the crosslinkable monomer. Specific examples of such an addition polymerizable monomer include styrene, methacrylates such as methyl methacrylate, ethyl methacrylate and propyl methacrylate, methacrylic acid, acrylates such as methyl acrylate, ethyl acrylate and propyl acrylate, acrylic acid, acrylonitrile, methacrylonitrile, ethyl vinyl benzene, vinyl toluene, vinyl naphthalene, butadiene and isoprene.

The anion exchanger used in the present invention can be prepared by forming a crosslinked copolymer by these starting material monomers and then introducing ammonium groups to the —R—Z moieties of the structural units derived from the precursor monomer of the formula (b). This crosslinked copolymer can be produced in accordance with a conventional method, and it is usually obtained in the form of a spherical crosslinked copolymer. Namely, the precursor monomer to form structural units of the formula (a) i.e. the precursor monomer represented by the formula (b), the unsaturated hydrocarbon group-containing crosslinkable monomer and the addition polymerizable monomer to be used as the case requires, are subjected to suspension polymerization in accordance with a conventional method in the presence of a polymerization initiator. The precursor monomer to provide structural units of the formula (a), is used in an amount of from 20 to 98.5% by weight relative to the total amount of the starting material monomers.

The compositional ratio of the unsaturated hydrocarbon group-containing crosslinkable monomer gives a substantial influence over the insolubilization of the anion exchanger used in the present invention. Usually, if the compositional ratio of the unsaturated hydrocarbon group-containing crosslinkable monomer is low, it tends to be difficult to accomplish insolubilization of the anion exchanger. On the other hand, if the compositional ratio of the unsaturated hydrocarbon group-containing crosslinkable monomer is high, the proportion of the ion exchange component of the anion exanger tends to be low, such being practically undesirable. Accordingly, for the preparation of the anion exchanger of the present invention, the unsaturated hydrocarbon group-containing crosslinkable monomer is used usually in a weight ratio of from 1.5 to 55%, preferably from 1.5 to 25%, relative to the total amount of the starting material monomers. If the crosslinkable monomer is used in a weight ratio of less than the above range, for example less than 1.0%, it is not preferable from economical point of view since an ion exchange capacity per unit volume decreases and an amount of water treated is accordingly reduced.

On the other hand, the addition polymerizable monomer as a copolymer component is used in a weight ratio of from 0 to 50%, preferably from 0 to 20%, relative to the total amount of the starting material monomers.

As the polymerization initiator to be used for the suspension polymerization, benzoyl peroxide, lauroyl peroxide, t-butylhydro peroxide or azobisisobutyronitrile may be employed. It is used usually in an amount of from 0.1 to 5% by weight relative to the total amount of starting material monomers.

The polymerization temperature varies depending upon the type and concentration of the polymerization initiator. However, it is usually selected within a range of from 40° to 100° C.

As a method for introducing ammonium groups to the crosslinked copolymer thus prepared, any conventional method may be employed. For example, a method may be employed wherein the resin is suspended in a solvent and a substituted amine of the formula

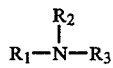

wherein $R_1$, $R_2$ and $R_3$ are as defined above with respect to the formula (a) is reacted thereto. As a solvent to be used for this introduction reaction, a solvent capable of swelling the resin is preferable. For example, water, an alcohol, toluene, dioxane and dimethylformamide may be used alone or in combination. The reaction temperature substantially varies depending upon the type of the substituted amine and the type of the solvent. Usually, however, it is selected within a range of from 20° to 100° C.

The anion exchanger used in the present invention prepared as described above, is particularly preferably composed of from 20 to 98.5% by weight of structural units having a group represented by

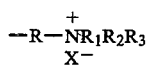

as defined in the formula (a), from 1.5 to 55% by weight of structural units derived from the unsaturated hydrocarbon group-containing crosslinkable monomer and from 0 to 20% by weight of structural units derived from other addition polymerizable monomer.

The resin thus obtained contains generally $Cl^-$ or $Br^-$ as $X^-$, but $X^-$ may be changed to various anion types by conventional methods to obtain the anion exchangers used in the present invention.

As the anion exchanger used in the present invention, X is preferably a hydroxyl ion, and when X is an anion other than a hydroxyl ion, it is preferably converted to a hydroxyl ion. Particularly preferred is the one which has an ion exchange capacity remaining rate of at least 85%, preferably at least 90%, more preferably at least 95%, and a volume maintaining rate of at least 90%, preferably at least 95% even when heated in a 0.1 N sodium hydroxide aqueous solution at 100° C. for 60 hours.

The shapes of the anion exchangers of the present invention are not particularly limited, but include, in addition to those of beads shape as described above, one having porosity imparted to it by a conventional method. In order to impart porosity to the ion exchanger, in the suspension polymerization of the above monovinyl compound and polyvinyl compound, there is added a solvent including a hydrocarbon solvent such as a heptane, an alcohol such as amyl alcohol or a linear polymer such as polystyrene. (This method is disclosed, for example, in "Ion Exchangers "[Editor: Konrad Dorfer, Walter de Gruyter Co., Ltd., 1990]). Beads-like anion exchanger preferably has a paticle size of from 300 to 2,000 $\mu$m. Further, anion exchangers made into various shapes such as fibrous, powdery, plate-like or membrane-like shapes are included in the present invention.

According to the method of the present invention, anions are adsorbed and removed by ion exchange at a high temperature (under a temperature condition of at least 60° C. in the case of a reprocessed type (OH type) ion exchanger resin). The reaction system itself may be placed under a condition of a high temperature or a solution to be passed may have a high temperature.

The method of the present invention is very useful since a solution to be treated is not required to be cooled. Anions to be removed by the method of the present invention are not specially limited, but examples of the anions to be removed include $CO_3^{2-}$, $NO_3^-$, $Cl^-SO_4^{2-}$, $PO_4^{3-}$, $NO_2^{2-}$ and the like The method for treating hot water in a power plant by using the anion exchanger in accordance with the present invention is applicable for treating various hot waters in a power plant.

A demineralizing process may be any type of known processes, and the anion exchanger of the present invention may be used in a form of a mixed bed comprising the anion exchange resin and a known cation exchange resin, a bed prepared by connecting a single bed of the anion exchange resin with a single bed of a cation exchange resin or a device prepared by precoating a powdery or fiber-like ion exchange resin on an element. Examples of the known cation exchange resin used in the present invention include a strongly acidic cation exchange resin prepared by sulfonating a copolymerized resin of monovinyl monomer and polyvinyl monomer (for example, a copolymer of divinyl benzene with styrene and ethyl styrene) with a sulfonating agent such as sulfuric acid, chlorosulfuric acid or sulfur trioxide. Commercially available and suitably usable examples of these known cation resins include "DIAION SKIB, PK 216— (manufactured by Mitsubishi Kasei Corporation), "Amberlite IR 120B, IR 200C" (manufactured by R & H Co., Ltd.).

The crosslinked anion exchanger used in the present invention has excellent heat resistance, and is stable for a long period of time at a high temperature of about 100° C. as evident from the following Examples.

Thus, according to the hot water-treating method of the present invention, in the demineralizer and the like of nuclear reactor water in a power plant, the hot water to be treated may have only to be cooled to a temperature of about 100°-120° C. Consequently, the method of the present invention largely reduces heat loss, and a cooling equipment can be minimized and the load of the cooling equipment can be reduced, thereby providing a great economical advantage.

Water treatment in a power plant in accordance with the present invention includes a demineralizing treatment of condensate (recycled water), and a demineralizer equipped with a mixed bed comprising a cation exchange resin and an anion exchange resin is placed in the treating system.

The treatment of condensate in a boiling water type nuclear reactor (BWR) is illustrated in FIG. 1 as an example of the treating system of condensate treatment.

FIG. 1 is a flowchart illustrating the outline of the conventional BWR. In the BWR, vapor generated in a pressure vessel 1 of a nuclear reactor is passed through the main conduit 2 into a turbine 3, and the vapor used therein is passed into a condenser 4. The vapor is condensed in the condenser 4, and the condensate is passed into a condensate demineralizer 5 by means of a pump 6.

Water purified in the condensate demineralizer 5 is passed into a reprocessed heat exchanger 8 by means of a pump 7, and is heated therein. The major portion of the water thus reprocessed is supplied to the pressure vessel 1 through a water-supplying conduit 9, and the remaining portion is recycled through a reactor water recycle line 10. The recycle line 10 is equipped with another demineralizer 11.

Figure 2:
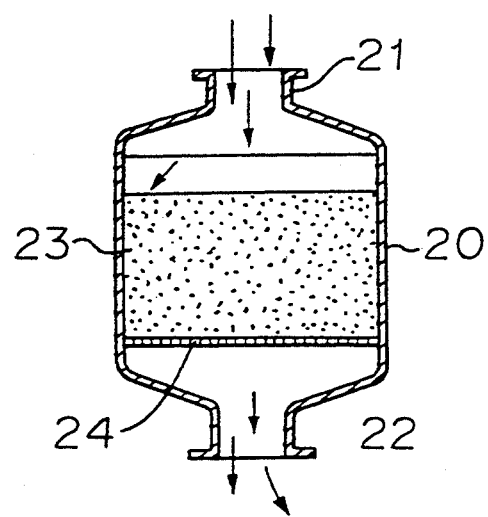

An example of the demineralizer is illustrated in FIG. 2. FIG. 2 shows the longitudinal section of the demineralizer usable in the present invention, and a vessel 20 has a condensate inlet conduit 21 at the upper end and a condensate outlet conduit 22 at the lower end. The inlet conduit 21 and the outlet conduit 22 are connected with the respective devices in the plant as shown in FIG. 1. The condensate to be demineralized enters through the inlet conduit 21, and passes through an ion exchange resin bed 23 and through a strainer 24 into the condensate outlet conduit 22, from which the condensate goes out of the device.

The temperature of the condensate (also in the recycle line) is not lowered lower than 60°–70° C., and therefore a heat resistant ion exchange resin endurable for water treatment at such a high temperature is required.

Since a cation exchange resin generally has a satisfactory heat resistance, a publicly known cation exchange resin is usable. On the other hand, however, since a publicly known anion exchange resin often causes detachment or decomposition of an ion exchange group, such a heat resistant anion exchange resin as used in the present invention is required.

Taking a reactor water demineralizer in a nuclear power plant (BWR) for instance, heat loss was compared between a conventional anion exchange resin and the crosslinked anion exchanger used in the present invention as mentioned below.

In the case of using the conventional anion exchange resin in the above-mentioned treating system, a reactor water of about 280° C. is cooled to about 50° C. by a condenser of a non-reprocessed heat exchanger or a reprocessed heat exchanger since the heat resistance of the conventional anion exchanger is poor. The reactor water is then purified in a demineralizer, and is heated to about 220° C. by the reprocessed heat exchanger and is recycled to the reactor. The heat loss in this case is about $6.2 \times 10^4$ Kcal/m$^3$ of reactor water, and is mainly caused in the non-reprocessed heat exchanger. The heat loss in a 1,000 MW grade unit is about $10.6 \times 10^6$ Kcal (corresponding to 4.1 MW/hr).

On the other hand, in the case of using the crosslinked anion exchange resin in accordance with the present invention, the temperature of a reactor water passed through a demineralizer can be adjusted to 100° C., thus largely reducing heat loss and saving about 0.2% of the consumption of nuclear fuel. This corresponds to about 1.7 MW/hr of electric power generation capacity in a 1,000 MW grade unit.

Talking of heat shock, when a nuclear reactor is urgently stopped (scrammed) by an accident or other causes, vapor generated after stopping is passed into a condenser to be cooled. In this case, since the condensate having a temperature higher than the allowable temperature (60° C.) of a condensate demineralizer is passed through the demineralizer temporarily or for a long time, an anion exchange resin charged in the demineralizer is degraded by heat and its performance is lowered. Consequently, the ion exchange resin must be sometimes replaced.

On the other hand, in the case of using the crosslinked anion exchanger in accordance with the present invention, such a trouble can be easily handled and there is caused no problem as mentioned above.

Now, the present invention will be described in further detail with reference to Examples. However, it should be understood that the present invention is by no means restricted to such specific Examples.

PREPARATION EXAMPLE 1

Preparation of a ω-haloalkylstyrene 100 g of chloromethylstyrene was reacted with metal magnesium at 0° C. for 3 hours under stirring in a diethyl ether flushed with nitrogen to obtain a magnesium composite. The solvent was replaced by tetrahydrofuran flushed with nitrogen. Then, 1,3-dibromopropane and Li$_2$CuCl$_4$ were dropwise added thereto at 0° C. The reaction was continued at 0° C. for 5 hours, and the obtained product was fractionated by distillation. 4-bromobutylstyrene was obtained under 0.3 Torr at 120° C. and the yield based on the starting material chloromethylstyrene was 35%. Identification of 4-bromobutylstyrene was conducted by the NMR method disclosed in "Journal of Polymer Science, Polymer Chemistry Edition, volume 20 (1982), p. 3015".

Preparation of a crosslinked ω-haloalkylstyrene

To 96.4 parts by weight of 4-bromobutylstyrene thus obtained and 3.6 parts by weight of divinyl benzene of industrial grade (purity: 55%, the rest being composed mainly of ethyl vinyl benzene), 1.0 part by weight of azobisisobutyronitrile was added, and the mixture was subjected to suspension polymerization under a nitrogen atmosphere at 70° C. for 18 hours to obtain polymer beads in a yield of 90%.

Preparation of an anion exchanger 100 parts by weight of crosslinked 4-bromobutylstyrene thus obtained, was suspended in 300 parts by weight of dioxane, stirred and swelled for two hours.

Then, 3 mol equivalent, based on the bromine containing group, of trimethylamine was dropwise added thereto, and the suspension was reacted continuously at 50° C. for 10 hours.

The obtained anion exchanger was thoroughly washed with deionized water, and the salt type was converted to a chlorine type.

Thus, an anion exchanger having the following properties was obtained.

Ion exchange capacity: 0.79 meq/ml, 3.77 meq/g
Water content: 67.4%
This anion exchanger is designated as Sample A.

The above properties were measured in accordance with the methods described by Honda et al in "Ion Exchange Resin, published by Hirokawa Shoten, p. 17–56".

PREPARATION EXAMPLE 2

An anion exchanger was prepared in the same manner as in Preparation Example 1 except that in the preparation of a crosslinked ω-haloalkylstyrene in Preparation Example 1, 4-bromobutylstyrene was changed to 92.7 parts by weight and divinyl benzene of industrial grade was changed to 7.3 parts by weight.

Thus, an anion exchanger having the following properties was obtained.

Ion exchange capacity:1.10 meq/ml, 3.65 meq/g
Water content: 54.1%

This anion exchanger is designated as Sample B.

PREPARATION EXAMPLE 3

An anion exchanger was prepared in the same manner as in Preparation Example 2 except that in the preparation of a ω-haloaklylstyrene in Preparation Example 1, 1,6-dibromohexane was used instead of 1,3-dibromopropane.

Thus, an anion exchanger having the following properties was obtained.

Ion exchange capacity:1.16 meq/ml, 3.07 meq/g
Water content: 44.1%

This anion exchanger is designated as Sample C. The intermediate 7-bromoheptylstyrene was fractionated by distillation under 0.4 Torr at 120° C.

PREPARATION EXAMPLE 4

An anion exchanger was obtained in the same manner as in Preparation Example 1 except that in the preparation of an ω-haloalkylstyrene in Preparation Example 1, 1,4-bis(bromomethyl)cyclohexane was used instead of 1,3-dibromopropane.

Thus, an anion exchanger having the following properties was obtained.

Ion exchange capacity:0.96 meq/ml 2.77 meq/g
Water content: 49.6%

This anion exchanger is designated as Sample D.

The intermediate 2-(4-bromomethylcyclohexylene)ethylstyrene was fractionated by distillation under 0.25 Torr at 120° C.

PREPARATION EXAMPLE 5

Preparation of 3-bromopropylstyrene 83.16 g of p-chlorostyrene was reacted with metal magnesium at 35° C. for 5 hours under stirring in tetrahydrofuran flushed with nitrogen to obtain a magnesium composite. This composite was dropwise added to a solution mixture comprising tetrahydrofuran, 1,3-dibromopropane and $Li_2CuCl_4$ at 30° C. The reaction was continued at 30° C. for two hours. Then, the obtained product was fractionated by distillation. 3-bromopropylstyrene was obtained under 0.2 Torr at 110° C., and the yield based on the starting material pchlorostyrene was 47%. Identification of 3-bromopropylstyrene was conducted by the NMR method.

Preparation of crosslinked 3-bromopropylstyrene

To 92.7 parts by weight of 3-bromopropylstyrene thus obtained and 7.3 parts by weight of divinyl benzene of industrial grade (purity: 55%, and the rest being composed mainly of ethyl vinyl benzene), 1.0 part by weight of azobisisobutyronitrile was added, and the mixture was subjected to suspension polymerization under a nitrogen atmosphere at 70° C. for 8 hours to obtain polymer beads in a yield of 79%.

Preparation of an anion exchanger 10 parts by weight of crosslinked 3-bromopropylstyrene thus obtained, was suspended in 100 parts by weight of dioxane, stirred and swelled for two hours.

Then, 10 mol equivalent, based on the bromine containing group, of trimethylamine was dropwise added thereto, and the suspension was continuously reacted at 50° C. for 10 hours.

The anion exchanger thereby obtained was thoroughly washed with deionized water, and then the salt type was converted to a chlorine type.

Thus, an anion exchanger having the following properties were obtained.

Ion Exchange capacity:1.37 meq/ml 3.80 meq/g
Water content: 49.6%

This anion exchanger is designated as Sample E.

EXAMPLE 1

Short period heat durability tests

Short period heat durability comparative tests were conducted with respect to Samples A, B, C and D obtained in the above Preparation Examples and Diaion SA102 (trade name, manufactured by Mitsubishi Kasei Corporation). 10 ml of each anion exchanger was measured as a chlorine type by means of a measuring cylinder, the chlorine type was converted to a free type by a column method. Centrifugal filtration was conducted to remove excess water, and then the anion exchanger was put into a test tube containing 40 ml of a 0.1N sodium hydroxide aqueous solution.

Under the above mentioned conditions where pH is high, a quaternary ammonium group is more easily converted to a tertiary amine group than under neutral conditions. The test tube was placed in an autoclave, and then the autoclave was heated to conduct a short period heat durability test.

The decrease of the ion exchange capacity when the anion exchanger was heated at 100° C. for 60 hours was as follows.

Here, the ion exchange capacity after the test is represented based on the volume before the test.

| Sample | Diaion SA102 | A | B | C | D |
|---|---|---|---|---|---|
| Ion exchange capacity before the test (meq/ml) | 0.83 | 0.79 | 1.10 | 1.16 | 0.96 |
| Ion exchange capacity after the test (meq/ml) | 0.72 | 0.69 | 1.07 | 1.14 | 0.94 |
| Ion exchange capacity remaining ratio (%) | 86.7 | 87.3 | 97.3 | 98.3 | 97.9 |
| Volume maintaining rate (%) | 80.2 | 96.0 | 94.0 | 95.0 | 95.8 |

EXAMPLE 2

Long period heat durability tests

Long period heat durability comparative tests were conducted with respect to Sample E obtained in Preparation Example 5 and Diaion SA10A (trade name, manufactured by Mitsubishi Kasei Corporation).

100 ml of each anion exchanger was measured as a free type by means of a measuring cylinder and put into a glass autoclave by means of deionized water to bring the total volume to 160 ml. While blowing nitrogen thereinto, the autoclave was heated at 50° C. for one hour to remove oxygen in water. The autoclave was closed and a long period heat durability test was conducted by maintaining it under a heated condition at 100° C. for 720 hours.

The decreases of the ion exchange capacity and the volume after the long period heat durability test were as follows.

Here, the ion exchange capacity after the test is represented based on the volume before the test.

|  | Sample | Diaion SA10A | E |
|---|---|---|---|
| Before the test | Ion exchange capacity (meq/ml) | 1.36 | 1.37 |
| After the test | Ion exchange capacity (meq/ml) | 0.82 | 1.09 |
|  | Remaining rate (%) | 60.3 | 79.2 |
|  | Volume maintaining rate (%) | 82.0 | 92.0 |

As evident from Examples 1 and 2, the ion exchange capacity and the volume of the anion exchange resin used in the present invention are not reduced even under high temperature conditions in comparison with other general ion exchange resins, and it is accordingly clear that the removal of anions is satisfactorily conducted even under high temperature conditions, particularly in the treatment of hot water in a power plant.

We claim:

1. A demineralizign process conducted at a high temperature condition of above 60° C., which comprises treating water with an ion exchanger containing a crosslinked anion exchanger wherein said crosslinked anion exchanger which comprises structural units having a quaternary ammonium group of the following formula (a) and structural units derived from an unsaturated hydrocarbon group-containing crosslinkable monomer, and of which at least 90% of anion exchange groups are present in the form of a group represented by

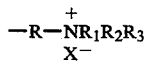

as defined in the following formula (a):

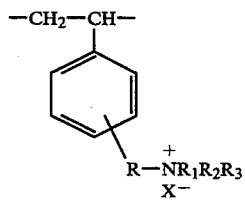

(a)

wherein R is a —$(CH_2)_n$— group (n=an integer of from 3 to 18) which may include a cyclic hydrocarbon, each of $R_1$, $R_2$ and $R_3$ which are independent from one another, is a $C_1$-$C_8$ hydrocarbon group or a $C_1$-$C_8$ alkanol group, the benzene ring of the formula (a) may be substituted by an alkyl group or a halogen atom, or may be condensed with other aromatic ring, and X is an anion.

2. The method according to claim 1, wherein substantially all of anion exchange groups are present in the form of structural units containing a group represented by

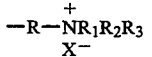

as defined in the formula (a).

3. The method according to claim 1, wherein said exchanger contains from 1.5 to 55% by weight of the units derived from an unsaturated hydrocarbon group-containing crosslinkable monomer.

4. The method according to claim 3, wherein said exchanger contains from 1.5 to 25% by weight of the structural units derived from an unsaturated hydrocarbon group-containing crosslinkable monomer.

5. The method according to claim 1, wherein said exchanger has an ion exchange capacity remaining rate of at least 90% and a volume maintaining rate of at least 90% after being heated in a 0.1 N sodium hydroxide aqueous solution at 100° C. for 60 hours as a hydroxide type.

6. The method according to claim 1, wherein R in the formula (a) is a —$(CH_2)_n$—group (n=an integer of from 3 to 10) which may include a cyclic hydrocarbon.

7. The method according to claim 1, wherein each of $R_1$, $R_2$ and $R_3$ in the formula (a) is a methyl group.

8. The method according to claim 1, wherein the unsaturated hydrocarbon group-containing crosslinkable monomer is divinyl benzene.

9. The method according to claim 1, wherein said exchanger comprises from 20 to 98.5% by weight of structural units having a group of the formula

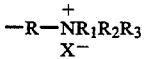

as defined in the formula (a), from 1.5 to 55% by weight of structural units derived from an unsaturated hydrocarbon group-containing crosslinkable monomer and from 0 to 20% by weight of structural units derived from other addition polymerizable monomer.

10. The method according to claim 5, wherein said exchanger has an ion exchange capacity remaining rate of at least 95% after being heated in a 0.1N sodium hydroxide aqueous solution at 100° C. for 60 hours as a hydroxide type.

11. The method according to claim 5, wherein said exchanger has a volume maintaining rate of at least 95% after being heated in a 0.1N sodium hydroxide aqueous solution at 100° C. for 60 hours as a hydroxide type.

12. The method according to claim 1, wherein $X^-$ is $OH^-$.

13. The method according to claim 1, wherein the anion exchanged by the method is $CO_3^{2-}$, $NO_3^-$, $Cl^-$, $SO_4^{2-}$, $PO_4^{3-}$ or $NO_2^{2-}$.

14. The method according to claim 6, wherein n is an integer of from 4 to 8.

15. A method for ion exchange-treating hot water in a power plant, which comprises treating water having a temperature of not lower than 60° C. with a crosslinked anion exchanger which comprises structural units having a quaternary ammonium group of the following formula (a) and structural units derived from an unsaturated hydrocarbon group-containing crosslinkable monomer, and of which at least 90% of anion exchange groups are present in the form of a group represented by

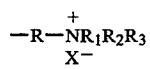

as defined in the following formula (a):

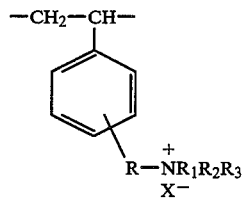

wherein R is a $-(CH_2)_n-$ group (n=an integer of from 3 to 18) which may include a cyclic hydrocarbon, each of $R_1$, $R_2$ and $R_3$ which are independent from one another, is a $C_1-C_8$ hydrocarbon group or a $C_1-C_8$ alkanol group, the benzene ring of the formula (a) may be substituted by an alkyl group or a halogen atom, or may be condensed with other armoatic ring, and X is an anion.

16. The method according to claim 14, wherein substantially all of anion exchange groups are present in the form of structural units containing a group represented by

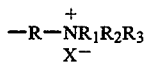

as defined in the formula (a).

17. The method according to claim 14, wherein said exchanger contains from 1.5 to 55% by weight of the units derived from an unsaturated hydrocarbon group-containing crosslinkable monomer.

18. The method according to claim 16, wherein said exchanger contains from 1.5 to 25% by weight of the structural units derived from an unsaturated hydrocarbon group-containing crosslinkable monomer.

19. The method according to claim 14, wherein said exchanger has an ion exchange capacity remaining rate of at least 85% and a volume maintaining rate of at least 90% after being heated in a 0.1N sodium hydroxide aqueous solution at 100° C. for 60 hours as a hydroxide type.

20. The method according to claim 14, wherein R in the formula (a) is a $-(CH_2)_n-$group (n=an integer of from 3 to 10) which may include a cyclic hydrocarbon.

21. The method according to claim 14, wherein each of $R_1$, $R_2$ and $R_3$ in the formula (a) is a methyl group.

22. The method according to claim 14, wherein the unsaturated hydrocarbon group-containing crosslinkable monomer is divinyl benzene.

23. The method according to claim 14, wherein said exchanger comprises from 20 to 98.5% by weight of structural units having a group of the formula

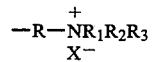

as defined in the (a), formula from 1.5 to 55% by weight of structural units derived from an unsaturated hydrocarbon group-containing crosslinkable monomer and from 0 to 20% by weight of structural units derived from other addition polymerizable monomer.

24. The method according to claim 18, wherein said exchanger has an ion exchange capacity remaining rate of at least 90% after being heated in a 0.1N sodium hydroxide aqueous solution at 100° C. for 60 hours as a hydroxide type.

25. The method according to claim 18, wherein said exchanger has a volume maintaining rate of at least 95% after being heated in a 0.1N sodium hydroxide aqueous solution at 100° C. for 60 hours as a hydroxide type.

26. The method according to claim 14, wherein $X^-$ is $OH^-$.

27. The method according to claim 14, wherein $X^-$ is $OH^-$, and which is conducted at a temperature of above 60° C.

28. The method according to claim 14, wherein the anion exchanged by the method is $CO_3^{2-}$, $NO_3^-$, $Cl^-$, $SO_4^{2-}$, $PO_4^{3-}$ or $NO_2^{2-}$.

29. The method according to claim 19, wherein n is an integer of from 4 to 8.

30. The process according to claim 1, wherein the crosslinked anion exchanger is present in the form of a mixed bed comprising said anion exchanger and a cation exchanger.

31. The process according to claim 1, wherein the ion exchanger is present in the form of a bed connecting a single bed of said crosslinked anion exchanger with a single bed of a cation exchange resin.

* * * * *